(12) United States Patent
Thon et al.

(10) Patent No.: US 11,977,370 B2
(45) Date of Patent: May 7, 2024

(54) SYSTEM AND METHOD FOR MINIMIZING NON-PRODUCTIVE IDLE TIMES WITHIN AN AUTOMATION PROCESS

(71) Applicant: Siemens Aktiengesellschaft, Munich (DE)

(72) Inventors: Ingo Thon, Grasbrunn (DE); Hans-Georg Köpken, Erlangen (DE); Josep Soler Garrido, Seville (ES)

(73) Assignee: Siemens Aktiengesellschaft, Munich (DE)

( * ) Notice: Subject to any disclaimer, the term of this patent is extended or adjusted under 35 U.S.C. 154(b) by 26 days.

(21) Appl. No.: 17/642,779

(22) PCT Filed: Sep. 2, 2020

(86) PCT No.: PCT/EP2020/074453
§ 371 (c)(1),
(2) Date: Mar. 14, 2022

(87) PCT Pub. No.: WO2021/058246
PCT Pub. Date: Apr. 1, 2021

(65) Prior Publication Data
US 2022/0382264 A1 Dec. 1, 2022

(30) Foreign Application Priority Data
Sep. 26, 2019 (EP) .................................... 19199858

(51) Int. Cl.
*G05B 19/418* (2006.01)
(52) U.S. Cl.
CPC ... *G05B 19/41885* (2013.01); *G05B 19/4187* (2013.01)

(58) Field of Classification Search
None
See application file for complete search history.

(56) References Cited

U.S. PATENT DOCUMENTS

| | | |
|---|---|---|
| 2015/0248128 A1 | 9/2015 | Davis et al. |
| 2019/0258222 A1 | 8/2019 | Karandikar et al. |

FOREIGN PATENT DOCUMENTS

| | | |
|---|---|---|
| WO | 2019052649 A1 | 3/2019 |

OTHER PUBLICATIONS

Dereli, T. et al; "Allocating optimal index positions on tool magazines using genetic algorithms"; Robotics and autonomous systems; Elsevier; vol. 33; No. 2-3; pp. 155-167; XP004218303; ISSN: 0921-8890; DOI: 10.1016/S0921-8890; 2000.

(Continued)

*Primary Examiner* — Carlos R Ortiz Rodriguez
(74) *Attorney, Agent, or Firm* — Schmeiser, Olsen & Watts, LLP (57) ABSTRACT

Provided is a system and method for minimizing non-productive idle times within an automation process executed by an automation facility, the system including a model memory which stores a probabilistic model of a distribution of object exchange times of objects used or consumed in the automation process; and an optimizer adapted to calculate optimal assignments of objects to magazine positions of an object storage magazine depending on the probabilistic model and depending on a sequence of productive non-idle times of objects used or consumed in process steps of the automation process.

16 Claims, 4 Drawing Sheets

(56) References Cited

OTHER PUBLICATIONS

Levitin, G. et al; "Algorithm for tool placement in an automatic tool change magazine"; International journal of production research; vol. 33; No. 2; pp. 351-360; XP009519437; 1995.

Krishna, Alluru Gopala et al; "Optimal allocation of index positions on tool magazines using an ant colony algorithm"; The international journal of advanced manufacturing technology; Springer Berlin; vol. 30; No. 7-8; pp. 717-721; XP019419092; ISSN: 1433-3015; 2005.

PCT International Search Report and Written Opinion of International Searching Authority dated Oct. 19, 2020, corresponding to PCT International Application No. PCT/EP2020/074453 filed Sep. 2, 2020.

Gamila Mansour Abou et al:"A modeling technique for loading and scheduling problems in FMS", Robotics and Computer-Integrated Manufacturing, vol. 19, No. 1-2, Feb. 2003, pp. 45-54, XP004410195, Issn: 0736-5845, DOI: 10.1016/S0736-5845(02)00061-3.

Carrie A.S et al: "Work scheduling in FMS under tool availability constraints", International Journal of Production Research, vol. 24, No. 6, 1986, pp. 1299-1308, ISSN: 0020-7543, XP093019682.

Hoda A. ElMaraghy: "Automated Tool Management in Flexible Manufacturing", Journal of Manufacturing Systems, vol. 4, No. 1, 1985, pp. 1-13, XP093019779.

Hirvikorpi MIKAika et al:"Job scheduling and management of wearing tools with stochastic tool lifetimes", International Journal of Flexible Manufacturing Systems, vol. 19, No. 4, Mar. 25, 2008, pp. 443-462, XP019604111, ISSN: 1572-9370.

Novas Juan M. et al:"Integrated scheduling of resource-constrained flexible manufacturing systems using constraint programming", Expert Systems with Applications, vol. 41, No. 5, Apr. 2014, pp. 2286-2299, XP028791102, ISSN: 0957-4174, DOI: 10.1016/J.ESWA. Sep. 26, 2013.

SYSTEM AND METHOD FOR MINIMIZING NON-PRODUCTIVE IDLE TIMES WITHIN AN AUTOMATION PROCESS

CROSS-REFERENCE TO RELATED APPLICATIONS

This application claims priority to PCT Application No. PCT/EP2020/074453, having a filing date of Sep. 2, 2020, which claims priority to EP Application No. 19199858.2, having a filing date of Sep. 26, 2019, the entire contents both of which are hereby incorporated by reference.

FIELD OF TECHNOLOGY

The following relates to a system and a method for minimizing non-productive idle times within an automation process executed by an automation facility.

BACKGROUND

An automation facility, in particular a factory, comprises a plurality of machines adapted to execute process steps of an automated process, in particular a manufacturing or production process. During the automation process, different kinds of objects can be used or consumed. These objects can for instance comprise machine tools and/or workpieces. Machine tools or workpieces are utilized by machines of the facility executing the automation process. Objects can also comprise materials consumed in the automation process such as raw materials. The object can also comprise containers to transport such materials. Machines of the factory can use machine tools to process workpieces and/or materials, e.g., by milling, drilling or other operations for removing material from a workpiece or adding material to a workpiece. During a process step of the automation process, a machine tool can be utilized. For using the machine tool, the machine tool can be fixed to a spindle of the machine. Different kinds of machine tools can be stored in a machine tool storage magazine, in particular in so-called rack-type object storage magazines. Every time a different machine tool is required for executing a process step of the automation process, the previously used machine tool is removed from the spindle and stored in the storage magazine, e.g., by a robot.

The robot can comprise a robot arm used for fetching and returning objects such as machine tools and/or workpieces or any other object required for performing the process step. The robot must not comprise necessarily a robot arm but can use any entity which moves the required object, in particular a machine tool, including e.g., conveyor belts or any other kind of handling device. During the manufacturing process, a machine tool can be fetched from the object storage magazine and then be transported to the spindle of the machine where it is fixed. Some object storage magazines can comprise an object handler, in particular a tool handler. This object handler allows to pre-fetch and to post-store the object while the machine of the facility is performing a process step with the current machine tool. Object handlers can be provided for different kinds of objects. For example, a machine tool handler can comprise two slots at a hand-over point between the spindle used for fixing the machine tool and the object storage magazine of the system. Nevertheless, even when using these kinds of object storage magazines comprising object handlers, non-productive idle times can be induced due to short process steps.

Figure 1:
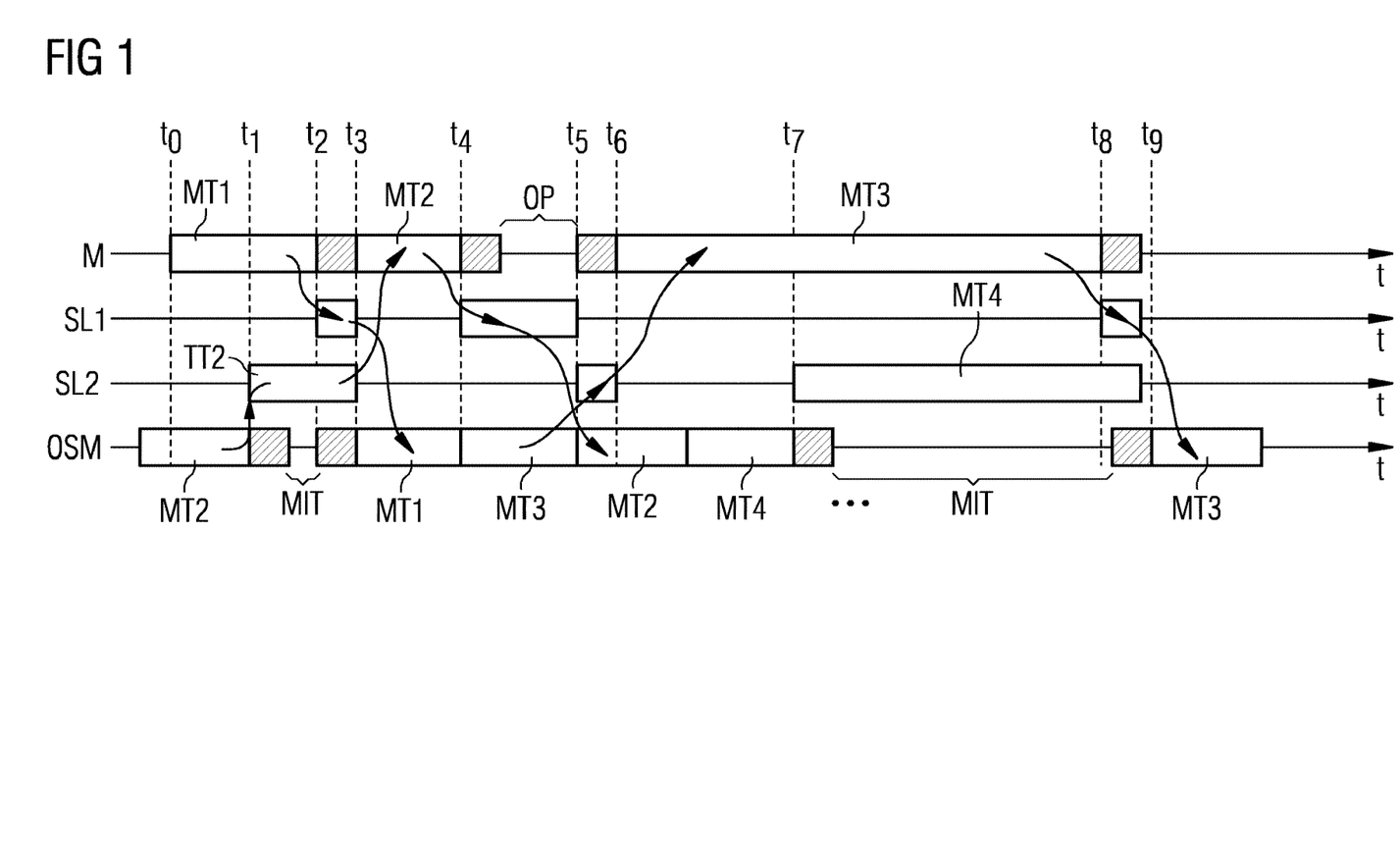
FIG. 1 shows timing diagrams for illustrating a problem underlying the embodiments of the present invention.

This is illustrated in the schematic diagram of FIG. 1. FIG. 1 shows a machine using sequentially different kinds of machine tools MTs wherein an object handler having two slots SL1, SL2 is provided to fetch a required machine tool MT from an object storage magazine OSM and to return the machine tool MT back to the object storage magazine OSM after the corresponding process step has been finished. In the illustrated example of FIG. 1, a machine M uses a first machine tool MT1 in a first process step of the automation process at a time t0 while a second machine tool MT2 required for the next process step is still stored in the object storage magazine OSM of the system. The next machine tool MT2 is pre-fetched by the object handler at time t1 and stored temporarily in the second slot SL2 of the tool handler as illustrated in FIG. 1. At a time t2, the process step requiring the first machine tool MT1 is terminated and the machine tool MT1 is moved to the first slot SL1 of the object handler as illustrated in FIG. 1. The object handler can then, for example, be rotated so that the second slot SL2 carrying the next machine tool MT2 is facing the machine M while the first slot SL1 carrying the no longer required first machine tool MT1 is facing the object storage magazine OSM. At time t3, the second machine tool MT2 is moved to the machine M and fixed e.g., in a spindle of the machine M for the next process step. The machine M uses the received machine tool MT2 for the next process step. In the meantime, the first machine tool MT1 is returned to the object storage magazine OSM. At time t4, the second machine tool MT2 is put back into the first slot SL1 of object handler while the next machine tool MT3 is placed into the other slot SL2 of the object handler at time t5. At time t6, the third machine tool MT3 is fixed to the spindle of the tool machine M while the no longer required second machine tool MT2 is placed back into the object storage magazine OSM. The fourth machine tool MT4 is placed in the second slot SL2 of the object handler at time t7 while the machine tool MT3 is returned back to the first slot SL1 of the object handler at time t8 as illustrated in FIG. 1. Finally, the machine tool MT3 is returned back to the object magazine at time t9. FIG. 1 further illustrates magazine idle times MIT where the object storage magazine OSM is idle and an optimization potential. The illustrated optimization potential OP time period derives from the circumstance that the time where the second machine tool MT2 is utilized is not sufficient to store the first machine tool MT1 and pre-fetch the third machine tool MT3. In case that the first machine tool MT1 and the third machine tool MT3 are stored in magazine positions of the object storage magazine OSM such that the handling time is reduced, non-productive idle times can be minimized. The machine tool handling times do mainly depend on the tool path in the object storage magazine OSM.

SUMMARY

In view of the optimization potential as illustrated in FIG. 1, an aspect relates to provide a method and system for minimizing non-productive idle times within an automation process executed by an automation facility.

Embodiments of the invention provide according to a first aspect a system for minimizing non-productive idle times within an automation process executed by an automation facility, said system comprising:
a model memory which stores a probabilistic model of a distribution of object exchange times of objects used or consumed in the automation process and
an optimizer adapted to calculate optimal assignments of objects to magazine positions of an object storage magazine depending on the probabilistic model and depending on a sequence of productive non-idle times of objects used or consumed in process steps of the automation process.

The probabilistic model stored in the model memory of the system according to the first aspect of embodiments of the present invention does incorporate random variables and probability distributions into a model of an event or phenomenon. While a deterministic model gives a single possible outcome for an event, the probabilistic model used by embodiments of the present invention gives a probability distribution as a solution.

The system according to the first aspect of embodiments of the present invention can be used for a wide range of different automation facilities where objects are processed or transported. The automation process executed by the automation facility can comprise a production process using and/or consuming objects to manufacture a product.

The automation process can also comprise a logistic process to store and/or to transport objects.

The objects can comprise different kinds of objects, in particular machine tools and/or workpieces utilized by the machines of the facility executing the automation process.

Further, the objects can also comprise materials consumed or moved in the automation process.

The objects can comprise containers which are adapted to transport objects such as machine tools, workpieces or materials.

The different kinds of objects can be stored in the object storage magazine of the system. The object storage magazines can comprise a plurality of magazine positions adapted to receive and store objects used in the automation process. The physical size of the object storage locations within the object storage magazine can correspond to the size of the different kinds of objects used in the automation process. The system according to embodiments of the present invention can comprise one or more object storage magazines for the same or different kinds of objects used in the automation process.

Accordingly, the system of embodiments of the present invention can be used for a wide range of different kinds of automation processes, in particular production and/or logistic processes.

In a possible embodiment of the system according to the first aspect of embodiments of the present invention, the object exchange time of an object comprises
a fetching time required for fetching the object by an object handler from a source magazine position in the object storage magazine to a target position for use in the automation process and a storing time for returning the object by the object handler from the target position to the same or a different source magazine position in the object storage magazine.

In a possible embodiment, each object storage magazine of the system which may be provided for a specific type of objects can comprise an associated object handler used for exchanging objects between the automation facility and the corresponding object storage magazine.

In a further possible embodiment of the system according to the first aspect of embodiments of the present invention, the probabilistic model stored in the model memory is built and/or learned by a model updater of the system based on observed object exchange times.

In a further possible embodiment, the probabilistic model stored in the model memory is built and/or learned depending on observed changes of the structure of the object storage magazine as indicated in a magazine knowledge graph.

The provision of the model updater has the advantage that the potential of the optimizer to reduce non-productive idle times can be evaluated without running explicit measurement campaigns. Experiments can be utilized to acquire information about the object storage magazine.

In a possible embodiment of the system according to the first aspect of embodiments of the present invention, the system is deployed on an edge device at the premise of the automation facility executing the automation process.

This provides the advantage that the latency times for exchanging information or data can be reduced so that the reaction time of the system to specific events can be minimized.

In a further possible embodiment of the system according to the first aspect of embodiments of the present invention, the system can be deployed on a cloud platform which is connected to the premise of the automation facility executing the automation process via a data network.

This embodiment has the advantage that specific services can be provided to the operator of the automation facility by the cloud platform provider.

In a further possible embodiment of the system according to the first aspect of embodiments of the present invention, the probabilistic model stored in the model memory comprises an artificial intelligence model, a regression model, a Gaussian process model or a Bayesian model.

Accordingly, embodiments of the present invention can make use of a wide variety of different probabilistic models adapted to corresponding use cases. The system may use different probabilistic models employed in the model memory for different kinds of automation processes. Consequently, the system according to the first aspect of embodiments of the present invention can be easily adapted to different automation environments and/or use cases.

In a further possible embodiment of the system according to the first aspect of embodiments of the present invention, the system comprises an instantiator adapted to derive automatically from the probabilistic model stored in the model memory a deterministic model applied to the optimizer which calculates the optimal assignments of objects to magazine positions of the object storage magazine on the basis of the derived deterministic model.

In a further possible embodiment of the system according to the first aspect of embodiments of the present invention, the system comprises a memory which stores a magazine knowledge graph comprising information about a structure of the object storage magazine and/or about physical characteristics of objects stored in the object storage magazine.

This provides the advantage that the system is adaptable or flexible to use different kinds of object storage magazines and can take even into account changes in the physical structure of the used object storage magazine.

In a further possible embodiment of the system according to the first aspect of embodiments of the present invention, the structure of the object storage magazine and/or information about the physical characteristics of objects stored in the object storage magazine can be gained automatically by measuring times required to move objects between different magazine positions of the object storage magazine directly or via the object handler of the system during the automation process or during magazine idle times where objects are neither fetched nor returned by the object handler of the system.

In a further possible embodiment of the system according to the first aspect of embodiments of the present invention, the system further comprises a risk evaluator adapted to evaluate a risk of inducing additional non-productive idle times by using specific magazine positions for storing objects in the object storage magazine.

In a further possible embodiment of the system according to the first aspect of embodiments of the present invention, the exchange time distribution of an object in the probabilistic model comprises a continuous density function.

In a further possible embodiment of the system according to the first aspect of embodiments of the present invention, process steps of the automation process are controlled by a control program executed by a controller of the automation facility using the optimal assignments of objects to magazine positions of the object storage magazine of the automation facility as calculated by the optimizer of the system.

In a possible embodiment of the system according to the first aspect of embodiments of the present invention, the object storage magazine comprises a plurality of magazine positions each being adapted to store one or more physical objects used or consumed in at least one process step of the automation process executed by the automation facility or adapted to store at least one container for physical objects used or consumed in the at least one process step of the automation process executed by the facility.

In a further possible embodiment of the system according to the first aspect of embodiments of the present invention, the sequence of productive non-idle times of objects used or consumed in process steps of the automation process executed by the automation facility is predefined in a control program and/or measured by sensor components of the automation facility.

Embodiments of the invention further provide according to a second aspect a computer-implemented method for minimizing non-productive idle times within an automation process executed by an automation facility.

Embodiments of the invention provide according to the second aspect a computer-implemented method for minimizing non-productive idle times within an automation process executed by an automation facility, comprising the steps of:
providing a probabilistic model of a distribution of object exchange times of objects used or consumed in the automation process, calculating optimal assignments of objects to magazine positions of an object storage magazine depending on the provided probabilistic model and depending on a sequence of productive non-idle times of objects used or consumed in process steps of the automation process and controlling process steps of the automation process in response to the calculated optimal assignments of objects to magazine positions of the object storage magazine.

BRIEF DESCRIPTION

Some of the embodiments will be described in detail, with reference to the following figures, wherein like designations denote like members, wherein.

DETAILED DESCRIPTION

Figure 2:
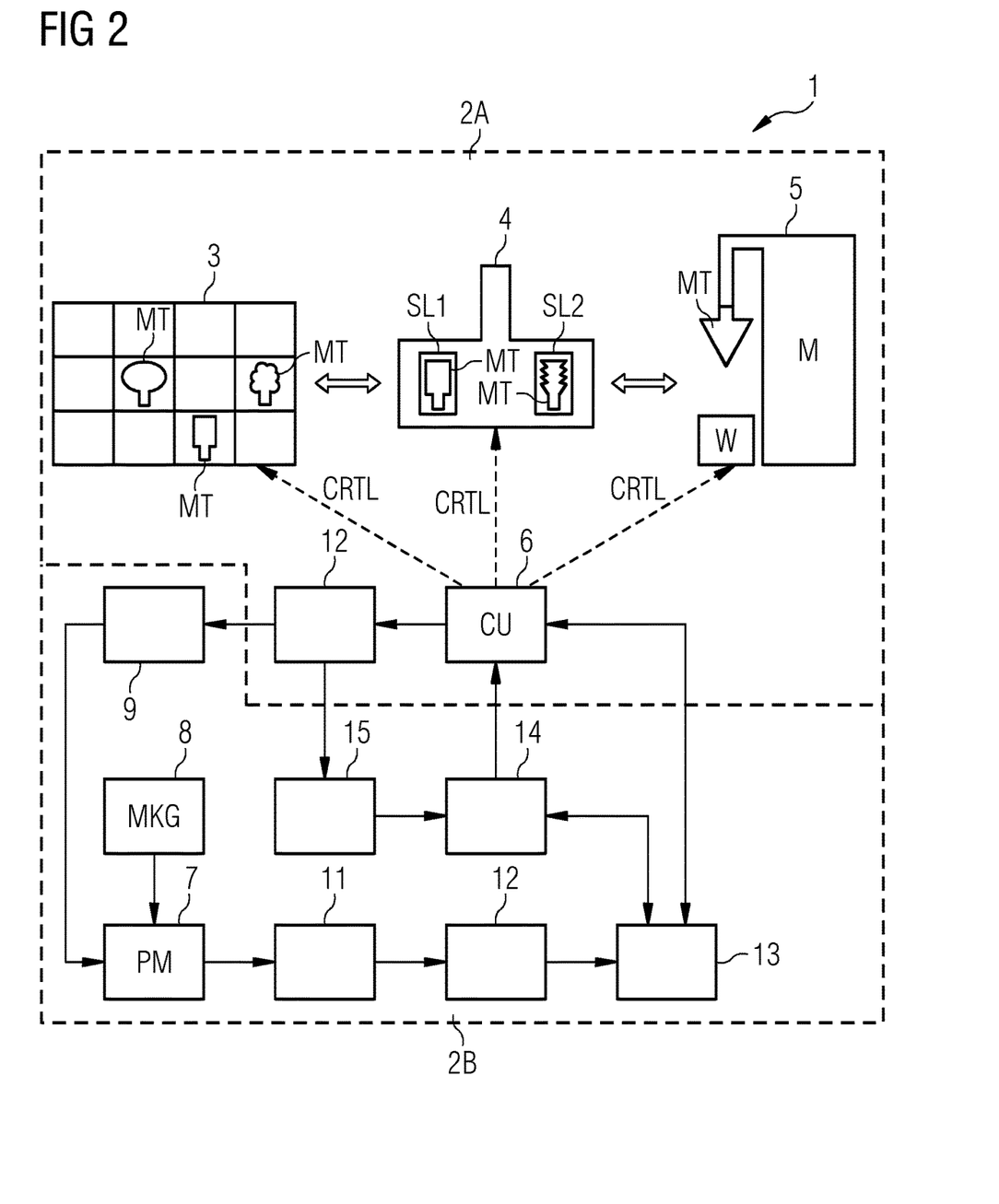
FIG. 2 shows a block diagram of a possible exemplary embodiment of a system according to the present invention.

In the illustrated embodiment of FIG. 2, the diagram shows an embodiment of the system 1 according to embodiments of the present invention including a machine tool system 2A connected to an optimization system 2B. The machine tool system 2A is used for handling and managing machine tools MT used by machines of an automation production facility. The machine tools MT form objects used in process steps of the automation process. In the illustrated embodiment, the machine tool system 2A comprises an object storage magazine 3 adapted to store machine tools MT as objects used by machines 5 of a production facility. In the illustrated schematic block diagram of FIG. 1, an object handler 4 is provided between the tool machine 5 and the object storage magazine 3. The object handler 4 can for instance be provided for switching or exchanging machine tools MT required in consecutive production steps performed by the tool machine 5 during the production process. The object handler 4 can fetch one or more objects from the object storage magazine 3 and supply the objects to at least one tool machine 5. An object can be for instance a machine tool MT fixed to a spindle of the tool machine 5. The machine tool MT can be for instance a tool for milling a workpiece W or for drilling a hole into a workpiece W. After the automation process step has been finalized and the corresponding machine tool MT is no longer required, the object handler 4 can fetch the machine tool MT from the tool machine 5 and put it back into the object storage magazine 3. In the illustrated embodiment of FIG. 2, the machine tool system 2 comprises a single machine tool magazine 3. The number and kind of object storage magazines 3 can vary depending on the specific use case or automation process. For instance, there can be different kinds of object storage magazines 3 with different kinds of objects required by different production steps in a production facility comprising different kinds of tool machines 5. Each object storage magazine 3 may comprise an associated object handler 4 used for handling the objects between the production or automation facility and the respective object storage magazine 3. The transport of the objects between the object storage magazine 3 and the object handler 4 as well as between the object handler 4 and the tool machine 5 can be provided by using actuators, in particular robot arms or conveyor belts. The object storage magazine 3 of the machine tool system 2 is provided for storing and fetching machine tools MT needed in production steps of the production process. The tool machine 5 utilizes the received machine tools MT for performing different kinds of production steps such as milling and drilling. The tool machine 5 may receive other objects from other object storage magazines 3, for instance workpieces or raw materials required for performing certain production steps. The object handler 4 illustrated in FIG. 1 is optional and is used for speeding up the switching, i.e. reducing exchange times of objects. The exchange time of an object comprises a fetching time as well as a storing time. The fetching time is the time required for fetching the respective object by the object handler 4 from a source magazine position in the object storage magazine 3 to a target position for use in the automation process, in particular a process step executed by the tool machine 5. The storing time comprises the time for returning the respective object by the object handler 4 from a target position to the same or a different source magazine position in the object storage magazine 3.

As illustrated in FIG. 1, the object storage magazine 3 or the object handler 4 as well as the machine 5 can be controlled by means of a NC program executed by a controller 6 of the machine tool system 2. The process steps of the automation process performed by one or more machines 5 of the automation facility can be controlled by a control program executed by the controller 6. The control program is aware about the location or position of the different objects in the object storage magazine 3.

Figure 5:
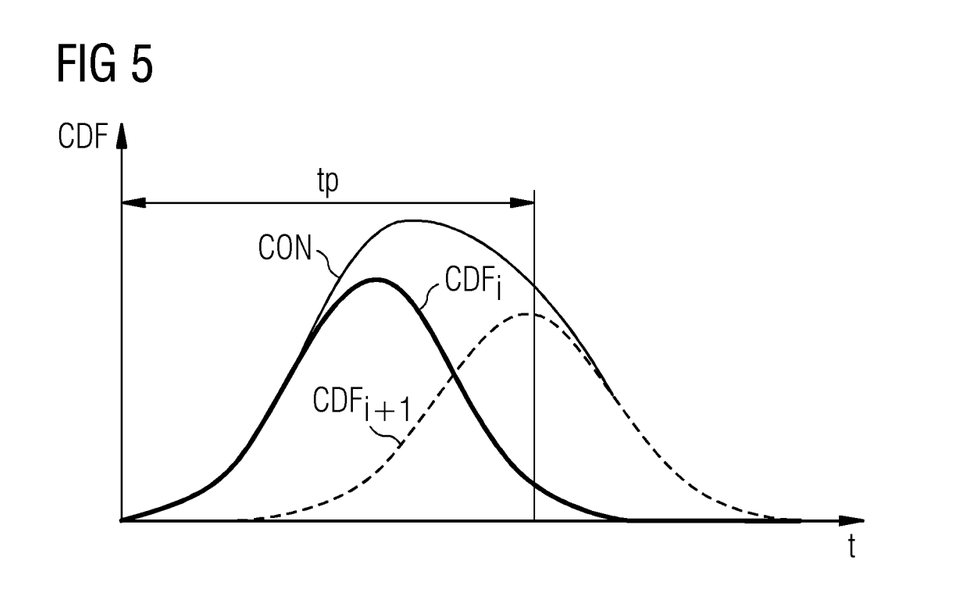
FIG. 5 shows an example of a continuous distribution function as used by the method and system according to the present invention.

The optimization system 2 shown in FIG. 2 comprises a memory 7 which stores a probabilistic model PM of a distribution of object exchange times of objects used or consumed in the automation process. The probabilistic model PM defines a probability distribution. The probabilistic model PM incorporates random variables and probabilistic distributions into the model of an event. In conventional legacy systems, tool exchange times can be measured by dedicated measurement campaigns. For such a measurement campaign, experiments to be executed need to be specified in terms of the control NC program. An experiment corresponds to a sequence of machine tool movements from source magazine positions to target magazine positions. These experiments have to be executed for a variety of machine tools MT as the exchange times also depend on tool properties of the machine tool MT. The machine tool properties can comprise the weight and geometry of the machine tool MT. The geometry of the machine tool MT can also influence which paths are collision-free. As not all machine tools MT can be put in all positions, the experiments have to be selected on a tool by tool basis. Finally, there can be an increase of movement and/or exchange times if close by magazine positions within the object storage magazine 3 are allocated due to collision avoidance. After executing these experiments, the results need to be interpolated if not all datasets are collected. The datasets can comprise a quadruple (source position, target position, object ID, exchange time). Collecting the exchange times for all triples (source position, target position, object ID) is prohibitive time-consuming for large object storage magazines 3 having a plurality of locations for storing a plurality of different objects. Moreover, the experiments might need to be executed multiple times to deal with statistical uncertainty. An approach taken in a conventional legacy system to build an exchange time profile while avoiding dedicated measurement campaigns is based on observing the tool machine 5 and simply collect statistics over the tool exchanges. However, also this procedure will take a prohibitive long time due to the amount of possible combinations. The probabilistic model PM used in the system 1 according to embodiments of the present invention stored in the model memory 7 replaces the exchange time in the quadruple (source position, target position, object ID, exchange time) by a distribution over exchange times. This distribution can for example state that all exchange times between one and two minutes for a specific triple (source position, target position, object ID) are equally likely so that the times are distributed with an average exchange time of e.g., 1.5 minutes and an additional distribution shaping parameter. In a possible embodiment, the exchange time distribution of an object such as a machine tool MT in the probabilistic model PM can comprise a continuous density function CDF as also shown in FIG. 5. This continuous density function can represent how likely a specific exchange time is. In a simple case, each triple (source position, target position, object ID) has its own continuous density function CDF assigned. The distribution can for example be a Weibull distribution or another kind of distribution such as a Gaussian distribution. A so-called Gaussian process can be used. To speed up generalization over unseen data and over dates where little evidence has been observed in the past, the representation can typically be constructed with hierarchical priors factorizing/shrinking the prior/distribution over entire rows or columns of the object storage magazine 3. For example, for a rack-type object storage magazine 3, the prior over the mean is sampled from a distribution for the row in the object storage magazine 3, the column and the specific magazine position. Each prior is weight. Typically, the prior for the specific position can be initially set to zero with much higher confidence than the priors relating to the rack row and rack columns, where confidence reflects the prior that the position in the same rows have a similar exchange time and positions in the same column have a similar additive factor. Information about the physical layout of the object storage magazine 3 can be stored in a magazine knowledge graph MKG. The magazine knowledge graph MKG can store information about the physical layout of the object storage magazine 3, the type of the object storage magazine 3 as well as physical information about objects stored in the object storage magazine 3. The optimization system 2B can comprise a memory 8 which stores the magazine knowledge graph MKG. Further, the magazine knowledge graph MKG can comprise information or data about the physical structure of the object storage magazine 3 and/or about physical characteristics of objects stored within the object storage magazine 3. These objects can for instance comprise machine tools MT or workpieces W. The information about the structure of the object storage magazine 3 and/or about the physical characteristics of objects stored in the object storage magazine 3 is gained in a possible embodiment automatically by measuring times required to move objects between different magazine positions of the object storage magazine 3 via the object handler 4 during the automation process and/or during magazine idle times where objects are neither fetched or returned by the object handler 4 of the system 1.

The probabilistic model PM stored in the model memory 7 of the optimization system 2A can be built and/or learned by a model updater 9 of the optimization system 2B based on observed object exchange times and/or learned depending on observed changes of the structure of the object storage magazine 3 as indicated by the magazine knowledge graph MKG stored in the memory 8. The magazine knowledge graph MKG can contain for instance the structure and information about a rack of the object storage magazine 3. This can include the geometrical location of the magazine positions but also the physical characteristics of the objects stored in the rack such as the characteristics of a machine tool MT stored in the rack. In a possible embodiment, the magazine knowledge graph MKG can also comprise information about which kind of object can be stored at which location of the object storage magazine 3. The model updater 9 of the optimization system 2B can observe the object exchange times as they happen in reality, i.e. during runtime of the automated process. The distributions are updated accordingly. The model updater 9 can use different algorithms, for example Variational EM, Variational Algorithms or Sampling based like MCMC. The model updater 9 can receive information from a runtime evaluator 10 of the machine tool system 2A.

In the illustrated embodiment of FIG. 2, the optimization system 2B further comprises an instantiator 11. The instantiator 11 is adapted to derive automatically from the probabilistic model PM stored in the model memory 7, a deterministic model which can be stored in a model memory 12. The deterministic model stored in the memory 12 is applied to an optimizer 13 which calculates optimal assignments of objects to magazine positions of the object storage magazine 3 on the basis of the derived deterministic model stored in the memory 12. While the probabilistic model PM can represent the exchange times in a quadruple (source position, target position, object ID, exchange time) as a distribution, the optimizer 13 does expect concrete times. The instantiation of the probabilistic model PM into a deterministic model can be performed by the instantiator 11 using different instantiation strategies. The first strategy can comprise a risk neutral strategy where the mean of the distribution is selected. This refers to the risk of selecting a wrong deterministic exchange time due to lack of knowledge. The second strategy which can be used for instantiating the probabilistic model PM into the deterministic model can comprise for example a pessimistic strategy which selects a value longer than the mean value. The distance to the mean value depends on the variance of the distribution. For example, selecting for Gaussian distributions, a value of μ+nσ (where μ refers to the mean value, n to the level of pessimisms and σ to the variance) results for e.g., n=1 and σ=68% in a time which is less than this value under the assumption that a proper prior has been selected. This strategy is pessimistic as it expects that the mean value be overly positive, while honoring its knowledge about the variance. A third optimistic instantiation strategy is similar but does subtract nσ. A further possible fourth strategy is to sample a deterministic exchange time from the distribution. The prior distribution of the exchange times can also be initialized from similar other object storage magazines. In a possible embodiment, the instantiator 11 can receive a control signal for selecting a specific instantiation strategy used for instantiating the probabilistic model PM stored in the memory 7 to get a deterministic model stored in the memory 12 and used by the optimizer 13.

In the illustrated embodiment of FIG. 2, the optimizer 13 is a deterministic model. In an alternative embodiment, also a probabilistic optimizer can be used replacing the instantiator 11, the memory 12 and the deterministic optimizer 13. The probabilistic optimizer can optimize over the exchange times using the probabilistic model PM stored in the model memory 7 directly.

In the embodiment illustrated in FIG. 2, the optimization system 2B further comprises a risk evaluator 14. The risk evaluator 14 can be used to evaluate a risk of inducing additional non-productive idle times using specific magazine positions for storing objects in the object storage magazine 3 of the machine tool system 2A. In a possible implementation, the risk evaluator 14 can run all object changes through the following procedure. For each object change (e.g., machine tool change), first the time for the processing step tp to be performed with the current machine tool MT is retrieved. Then, the continuous distribution function CDF; for storing the last machine tool MT; is retrieved by the risk evaluator 14. In the next step, the continuous distribution function CDF for retrieving the next machine tool MT is retrieved by the risk evaluator 14. The risk evaluator 14 forms the convolution (On both retrieved continuous distribution functions CDFs. To retrieve the continuous distribution function CDF for the non-productive idle time for this specific machine tool MT, the probability mass for all values below the current processing step time to zero is retrieved and subtracted from the current processing time as also illustrated in FIG. 5.

The convolution of the continuous distribution functions CDFs as shown in FIG. 5 does represent the distribution over the non-productive idle times. FIG. 5 shows the probability of the exchange time required for exchanging two machine tools MT in two consecutive steps of the manufacturing process.

In the embodiment illustrated in FIG. 2, the optimization system 2B comprises an experiment designer unit 15 which can use the magazine idle times MITs to retrieve automatically knowledge or information about the object storage magazine 3 of the machine tool system 2A. Magazine idle times MITs can result from longer production steps as also illustrated in the timing diagram of FIG. 1. If a processing step is significantly longer than the time needed to store the previous machine tool MT and fetching the next machine tool MT, the system 1 can utilize this time in a possible embodiment for performing measurements or experiments. The goal of these measurements is to gain a deeper understanding of the object storage magazine 3 and to update the probabilistic model PM stored in the model memory 7 accordingly. An experiment can typically consist of fetching an object, moving the object to the object handler 4 and moving the object back to its original position in the object storage magazine 3. Alternatively, the object can also be moved to a different magazine position if this does not interfere with the optimizer 13. The design of an experiment can be based on an observed lack of knowledge. Knowledge about magazine positions can be retrieved from the observed distributions provided by the experiments.

Exploration is required to retrieve additional information about the object storage magazine 3. Otherwise, the system 1 would either focus on magazine positions with known exchange times and underutilize the potential of the object storage magazine 3 or may take an unreasonable risk due to using magazine positions with unknown exchange times. The system 1 according to embodiments of the present invention can keep the risk under control by means of the risk evaluator unit 14. There can be two sources of exploration built into the system 1 either implicitly or explicitly. In a possible embodiment, exploration to retrieve information about an object storage magazine 3 can be based on the experiment designer unit 15. The second unit or component which can be used for exploration is the instantiator unit 11. The sampling based on an instantiation strategy with the most is risk neutral while leading to a higher degree of experimental experience.

The system 1 illustrated in the embodiment of FIG. 2 can be used for minimizing non-productive idle times within an automation process executed by the machines 5 of the automation facility. The system 1 comprises the model memory 7 which stores the probabilistic model PM of a distribution of object exchange times of objects such as machine tools MT used in the automation process and an optimizer 13 adapted to calculate optimal assignments of objects to magazine positions of the object storage magazine 3 depending on the probabilistic model PM and depending on a sequence of productive non-idle times of objects used in process steps of the automation process. The probabilistic model PM stored in the model memory 7 can comprise in a possible embodiment an artificial intelligence model. Other probabilistic models PM can be used as well, in particular a regression model, a Gaussian process model or a Bayesian model.

The system 1 as shown in FIG. 2 can be either deployed on an edge device at the premise of the automation facility executing the automation process or on a cloud platform connected to the premise of the automation facility executing the automation process via a data network.

Figure 3:
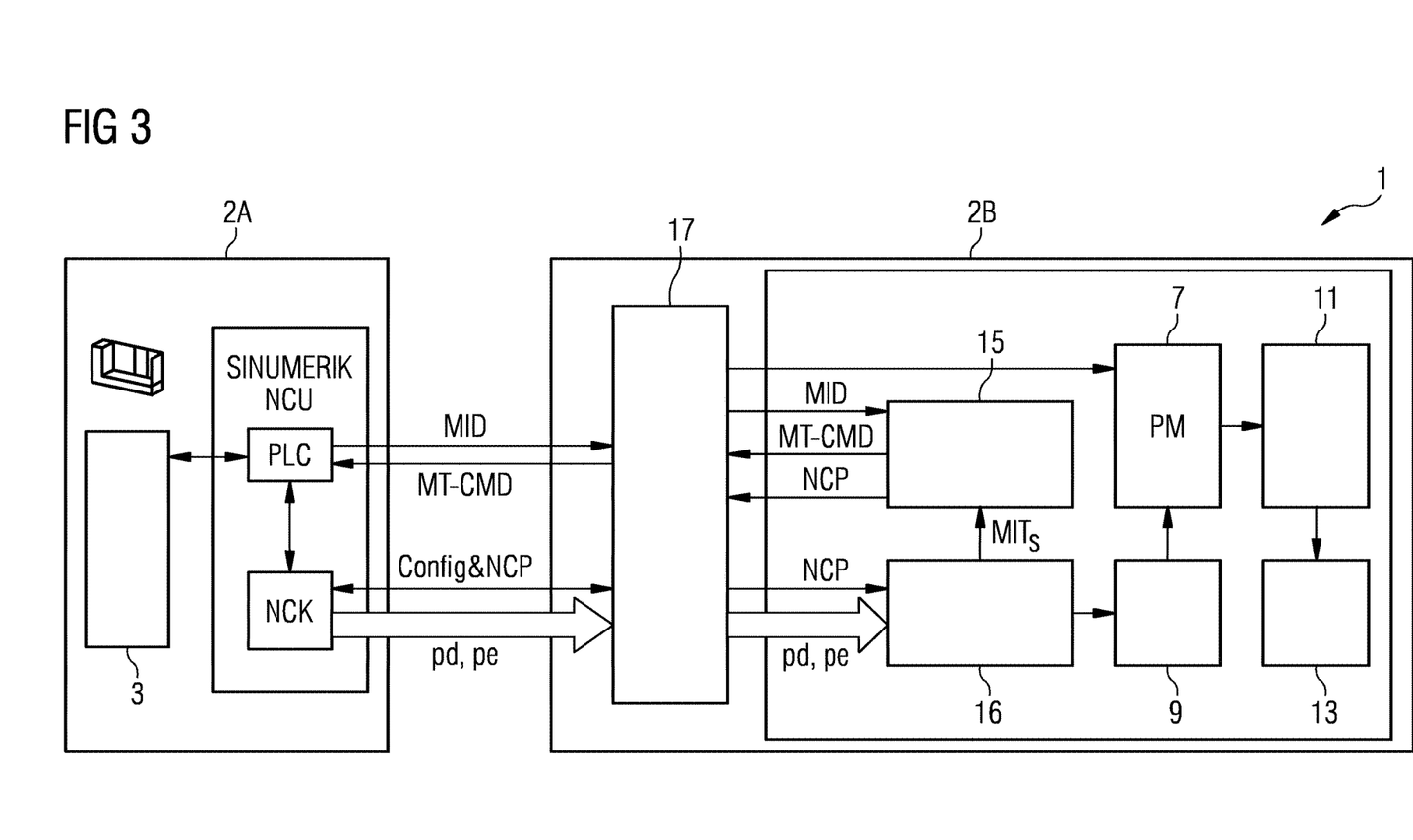
FIG. 3 shows a possible exemplary embodiment of a system according to the present invention.

FIG. 3 shows a block diagram of an embodiment of the system 1 according to embodiments of the present invention where the system 1 is deployed on an edge device. As can be seen in FIG. 3, the optimization system 2B is implemented on an edge device and forms an edge computing system. The machine tool system 2A can be connected to the edge computing system 2B via a machine interface 17 as shown in FIG. 3. The machine tool system 2A comprises at least one numerical control unit NCU. The numerical control unit NCU can in turn comprise multiple modules such as a numerical control kernel NCK which performs motion calculations and does control the machine process according to a control program. A further module of the numerical control unit NCU can comprise a PLC which can be used to control peripherals such as the external object storage magazines 3. The numerical control unit NCU can comprise further components such as drives, human-machine interfaces HMI or communication processors. The numerical control unit NCU of the machine tool system 2A can be connected to the edge computing system 2B via one or more data interfaces, for example network interfaces. The collection of interfaces including different drivers and data interpreters is depicted in FIG. 3 as the generic machine interface 17. Processing components (e.g., applications) hosted on the edge computing system 2B can use diverse types of information or data about the machine tool system 2A and can use processed data received via the machine interface 17. The NCU can provide current magazine information data MID concerning the object storage magazine 3. Further high precision information about positions and velocities of axes, information about active machine tools MT, selected machine tools MT, NC code and other machine configurations and settings can be received and processed by the edge computing system 2B. Further, the interface 17 can be used by the edge computing system 2B to load and execute numerical control programs NCPs on the numerical control unit NCU and possibly to send commands to the PLC. In the embodiment illustrated in FIG. 3, the optimization system 2B is deployed on an edge computing device. In a possible embodiment, a process monitoring unit 16 can parse high-frequency process data pd and process events pe during the execution of numerical control programs NCPs including monitoring duration of machine processing steps and the triggering and completion of tool-change events. This data can be made available to the model updater 9 in order to update the probabilistic model PM in response to the observed machine tool exchange times. Similarly, productive non-idle machining times for a particular NC control program (NCP) can be extracted and used by the experiment designer unit 15 to find suitable times for inserting experiments in order to improve the quality of the probabilistic model PM. The extraction of the machining times or processing times can be performed either from the same high-frequency data stream or alternatively, from a copy of the running NC control program NCP' obtained via the machine interface 17. These commands can be executed on the device either by means of deploying an NC control program or by issuing machine tool positioning commands MT-CMDs directly to the PLC and measuring the response times.

A possible sequence performed by an optimization application running on the edge computing system 2B connected to the numerical control unit NCU of the machine tool system 2A is able to optimize machine tool positions in the machine tool magazine 3 to reduce idle times for a given NC control program and tool configuration. The optimization component can obtain current tool settings of machine tools MT including machine tools in the magazine 3 and their magazine positions as well as an overall magazine configuration of the object storage magazine 3.

Optionally, a series of exchange time measurements can be selected to be performed before running the NC control program. This can be formulated as NC control programs themselves and deployed on the numerical control unit NCU of the machine tool system 2A. Alternatively, the selected series can be defined as a series of commands to the PLC. Further, exchange time measurements are performed and can be decided in a possible embodiment based on the current knowledge of the probabilistic model PM and the required knowledge to perform the optimization. Thereafter, the NC control program can be run for which optimal tool magazine positions are to be determined. During the execution of the NC program, the process monitoring unit 16 can compute a sequence of machine tools MT and a duration of corresponding machining phases as well as the times performed for changing machine tools MT from the machine tool magazine 3.

Optionally, the experiment designer unit 15 can send requests to the numerical control unit NCU to perform machine tool changes during machining phases where the object storage magazine 3 storing the machine tools MT is idle.

After execution of the NC program (NCP), the magazine optimizer 13 can be invoked with an instantiation of the most up-to-date probabilistic model PM for the tool changing times, along with the information collected by the process monitoring unit 16 regarding machine tool sequences and active productive non-idle times, and the retrieved overall magazine configuration information.

The resulting optimization can in a possible embodiment be either represented to a human operator via a human-machine interface, or alternatively, automatically implemented on the object storage magazine 3 via the machine interface 17. This can be in the form of an NC program to be run on the NCU for sorting the machine tools MTs in the optimal positions to minimize the idle times.

The system 1 according to embodiments of the present invention provides the possibility to evaluate the potential of the optimizer 13 to reduce non-productive idle times without running necessarily explicit measurement campaigns. This can be achieved mainly due to the provision of a model updater 9. Further, the experiment designer unit 15 can be utilized for faster acquisition information about the object storage magazine 3. This allows to predict a certain productivity increase of the automation facility.

The system 1 further provides for a reduced number of experiments or measurements due to a more focused evaluation of the magazine exchange times. This is a result of the experimentation strategy which implicitly takes the lack of knowledge into account. The required generalization over unseen data is due to the magazine knowledge graph MKG and the factorized probabilistic knowledge. Consequently, the operator of the automation facility will be more willing to deploy the optimization system as neither productive time is lost due to the measurement campaigns nor any wear-out is caused by such measurement campaigns.

A further advantage of the system 1 according to embodiments of the present invention is that no manual interpolation from a partial measurement campaign has to be done. This is achieved as the system 1 can generalize the acquired knowledge by means of factorized distributions which utilize the stored magazine knowledge graph MKG.

A further advantage of the system 1 according to embodiments of the present invention is that the risk for a mistake due to the lack of knowledge can be evaluated in a statistically sound manner. This is mainly due to the provision of the risk evaluator unit 14 of the optimization system 2B.

Further, the system 1 according to embodiments of the present invention can be learned online and adapt itself to new objects such as new machine tools MT. This is mainly due to the provision of the model updater 9. The system 1 achieves an object storage magazine optimization using model-based reinforcement learning. The system 1 according to embodiments of the present invention can improve a ratio of productive times to non-productive times in tool machines by minimizing non-productive idle times due to object changes, in particular machine tool changes. The system 1 according to embodiments of the present invention can be utilized for any kind of optimization systems where idle times are minimized. This can comprise also flexible conveyor belts in production facilities, logistics, material handling, robotics and airport logistics. In a possible implementation, the system 1 can be deployed on edge devices like Sinumerik Edge or SIMATIC Edge. In an alternative embodiment, the system 1 according to embodiments of the present invention can also be run as part of a cloud optimization system. The system 1 according to embodiments of the present invention can measure object exchange times without inducing additional non-productive times. In a possible embodiment, the probabilistic model PM stored in the model memory 7 can be updated or learned by the model updater 9 during runtime of the automation system. In a possible embodiment, the probabilistic model PM comprises an artificial neural network ANN which can undergo a reinforcement learning process. The artificial neural network ANN can be learned in a machine learning process using a training dataset including object exchange times. The artificial neural network ANN can comprise several layers to process data received by the process monitoring unit 16. In a possible embodiment, the model updater unit 9 can be used to train continuously the artificial neural network ANN stored in the model memory 7. The sequence of productive non-idle times of objects used or consumed in process steps of the automation process can in a possible embodiment be observed using sensor components of the automation facility and/or information derived from the executed control program.

Figure 4:
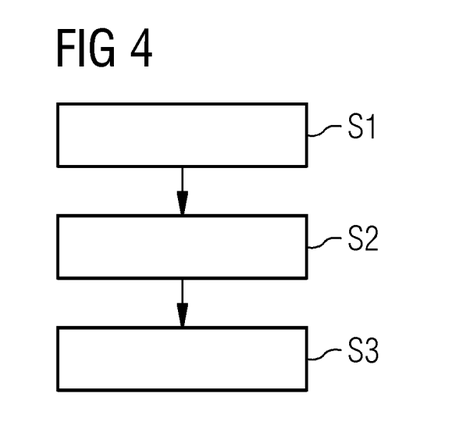
FIG. 4 shows a flowchart for illustrating a possible exemplary embodiment of a computer-implemented method according to a further aspect of the present invention.

FIG. 4 shows a flowchart of a possible embodiment of a computer-implemented method for minimizing non-productive idle times within an automation process executed by an automation facility. In the illustrated exemplary embodiment, the computer-implemented method comprises three main steps.

In a first step S1, a probabilistic model PM of a distribution of object exchange times of objects used or consumed in an automation process is provided. The probabilistic model PM can be stored within a model memory 7.

In a further step S2, optimal assignments of objects to magazine positions of an object storage magazine 3 are calculated depending on the probabilistic model PM and depending on a sequence of productive non-idle times of objects used or consumed in process steps of the automation process.

In a further step S3, the process steps of the automation process are controlled in response to the calculated optimal assignments of objects to magazine positions of the object storage magazine 3.

In a possible embodiment, the calculation of the optional assignments is performed by an optimizer unit such as the optimizer 13 illustrated in the embodiment of FIG. 2. The automation process controlled in step S3 can comprise in a possible embodiment a production process using objects such as machine tools MTs to manufacture a product. The object storage magazine 3 can comprise a plurality of magazine positions. The object storage magazine 3 can comprise one or more racks each having a predefined number of rows and columns to store objects. The magazine position can be indicated in a possible embodiment by a triple (rack number, column number, row number). By using knowledge or information stored in the magazine knowledge graph MKG, these magazine positions can be translated automatically into physical coordinates (x, y, z) of the respective magazine positions. The translation of magazine positions into physical coordinates can be performed in a possible embodiment individually for each object storage magazine 3 depending on the known physical structure as indicated in the magazine knowledge graph MKG of the respective magazine. This allows for a flexible use of different kinds of object storage magazines 3 in the system 1 according to embodiments of the present invention. In a possible embodiment, the probabilistic model PM and the magazine knowledge graph MKG can be loaded from a cloud platform as used by the optimizer 13 to calculate the optimal assignments of objects to magazine positions within the object storage magazine 3.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for minimizing non-productive idle times within an automation process executed by an automation facility, the system comprising:
   a model memory which stores a probabilistic model of a distribution of object exchange times of objects used or consumed in the automation process; and
   an optimizer adapted to calculate optimal assignments of objects to magazine positions of an object storage magazine depending on the probabilistic model and depending on a sequence of productive non-idle times of objects used or consumed in process steps of the automation process.

2. The system according to claim 1 wherein the objects comprise machine tools and/or workpieces utilized by machines of the automation facility executing the automation process and/or materials consumed in the automation process.

3. The system according to claim 1 wherein the object exchange time of an object comprises
   a fetching time required for fetching the object by an object handler from a source magazine position in the object storage magazine to a target position for use in the automation process and
   a storing time for returning the object by the object handler from the target position to the same or a different source magazine position in the object storage magazine.

4. The system according to claim 1 wherein the probabilistic model stored in the model memory is built and/or learned by a model updater of the system based on observed object exchange times and/or learned depending on observed changes of a structure of the object storage magazine as indicated by a magazine knowledge graph.

5. The system according to claim 1 wherein the system is deployed on an edge device at a premise of the automation facility executing the automation process or on a cloud platform connected to the premise of the automation facility executing the automation process via a data network.

6. The system according to claim 1 wherein the probabilistic model stored in the model memory comprises
an artificial intelligence model,
a regression model,
a Gaussian process model or
a Bayesian model.

7. The system according to claim 1 wherein the system further comprises an instantiator adapted to derive automatically from the probabilistic model stored in the model memory a deterministic model applied to the optimizer which calculates the optimal assignments of objects to magazine positions of the object storage magazine on the basis of the derived deterministic model.

8. The system according to claim 1 the system further comprising
a memory which stores a magazine knowledge graph comprising information about a structure of the object storage magazine and/or about physical characteristics of objects stored in the object storage magazine.

9. The system according to claim 8 wherein information about the structure of the object storage magazine and/or about the physical characteristics of objects stored in the object storage magazine is gained automatically by measuring times required to move objects between different magazine positions of the object storage magazine directly or via the object handler of the system during the automation process or during magazine idle times where objects are neither fetched nor returned by the object handler of the system.

10. The system according to claim 1, the system further comprising
a risk evaluator adapted to evaluate a risk of inducing additional non-productive idle times by using specific magazine positions for storing objects in the object storage magazine.

11. The system according to claim 1 wherein the exchange time distribution of an object in the probabilistic model comprises a continuous density function.

12. The system according to claim 1 wherein process steps of the automation process are controlled by a control program executed by a controller of the automation facility using the optimal assignments of objects to magazine positions of the object storage magazine of the automation facility as calculated by the optimizer of the system.

13. The system according to claim 1 wherein the automation process comprises
a production process using and/or consuming objects to manufacture a product or
a logistic process to store and/or transport objects.

14. The system according to claim 1 wherein the object storage magazine comprises a plurality of magazine positions each being adapted to store one or more physical objects used or consumed in at least one process step of the automation process executed by the automation facility or to store at least one container for physical objects used or consumed in the at least one process step of the automation process executed by the automation facility.

15. The system according to claim 1 wherein the sequence of productive non-idle times of objects used or consumed in process steps of the automation process executed by the automation facility is predefined in a control program or measured by sensor components of the automation facility.

16. A computer-implemented method for minimizing non-productive idle times within an automation process executed by an automation facility,
comprising the steps of:
providing a probabilistic model of a distribution of object exchange times of objects used or consumed in the automation process,
calculating optimal assignments of objects to magazine positions of an object storage magazine depending on the provided probabilistic model (PM) and depending on a sequence of productive non-idle times of objects used or consumed in process steps of the automation process and
controlling process steps of the automation process in response to the calculated optimal assignments of objects to magazine positions of the object storage magazine.

* * * * *